United States Patent
Coar et al.

(10) Patent No.: US 12,465,231 B2
(45) Date of Patent: Nov. 11, 2025

(54) HEMODYNAMIC MONITORING SYSTEM

(71) Applicant: DEEP SCIENCE, LLC, Bellevue, WA (US)

(72) Inventors: David Nelson Coar, Durham, NC (US); Tony Falcone, Hollis, NH (US); Brian Holloway, Snoqualmie, WA (US); Michael Madden, Temple, NH (US); Jay William McDaniel, Norman, OK (US)

(73) Assignee: DEEP SCIENCE, LLC, Bellevue, WA (US)

( * ) Notice: Subject to any disclaimer, the term of this patent is extended or adjusted under 35 U.S.C. 154(b) by 94 days.

(21) Appl. No.: 18/471,954

(22) Filed: Sep. 21, 2023

(65) Prior Publication Data

US 2024/0108236 A1   Apr. 4, 2024

Related U.S. Application Data

(60) Provisional application No. 63/460,863, filed on Apr. 20, 2023, provisional application No. 63/409,586, filed on Sep. 23, 2022.

(51) Int. Cl.
*A61B 5/00* (2006.01)
*A61B 5/029* (2006.01)
*A61B 5/05* (2021.01)

(52) U.S. Cl.
CPC .............. *A61B 5/029* (2013.01); *A61B 5/05* (2013.01); *A61B 5/7225* (2013.01)

(58) Field of Classification Search
CPC .......... A61B 5/029; A61B 5/05; A61B 5/7225
See application file for complete search history.

(56) References Cited

U.S. PATENT DOCUMENTS

| | | |
|---|---|---|
| 2009/0203972 A1 | 8/2009 | Heneghan et al. |
| 2010/0179421 A1 | 7/2010 | Tupin |
| | (Continued) | |

FOREIGN PATENT DOCUMENTS

| | | |
|---|---|---|
| CN | 113164094 A | 7/2021 |
| JP | 2016220816 A | 12/2016 |
| WO | 2017/157989 A1 | 9/2017 |

OTHER PUBLICATIONS

International Search Report and Written Opinion mailed Apr. 8, 2024, issued in corresponding international Application No. PCT/US2023/074822, filed Sep. 22, 2023, 9 pages.

(Continued)

*Primary Examiner* — Joel F Brutus
(74) *Attorney, Agent, or Firm* — Christensen O'Connor Johnson Kindness PLLC (57) ABSTRACT

Hemodynamic monitoring system is presented. In one embodiment, a system for non-invasive monitoring of a subject's heart includes an RF transmitting antenna. The RF transmitting antenna is configured for transmitting at least one transmitted RF signal toward the subject. The system also includes an RF receiving antenna. The RF receiving antenna is configured for receiving at least one received RF signal transmitted by the RF transmitting antenna and modified by a subject's body. The RF transmitting antenna and the RF receiving antenna are located on opposing sides of a planar projection of the subject's heart. The system also includes a processing circuit configured for: controlling transmitting and receiving of the RF signal, and determining, based on the at least one received RF signal, at least one physiological parameter of the subject.

25 Claims, 6 Drawing Sheets

*TIMING DIAGRAM*

(56) References Cited

U.S. PATENT DOCUMENTS

| | | | |
|---|---|---|---|
| 2011/0060215 A1* | 3/2011 | Tupin, Jr. | A61B 5/1075 |
| | | | 600/407 |
| 2013/0006126 A1* | 1/2013 | Band | A61B 5/029 |
| | | | 600/485 |
| 2014/0058256 A1 | 2/2014 | De Jong | |
| 2016/0022204 A1 | 1/2016 | Mostov | |
| 2020/0129084 A1 | 4/2020 | Suzuki | |
| 2020/0305759 A1 | 10/2020 | Barash et al. | |
| 2020/0367765 A1* | 11/2020 | Bacher | G01R 33/56308 |
| 2020/0367810 A1* | 11/2020 | Shouldice | H04R 1/08 |
| 2022/0047208 A1 | 2/2022 | Shin et al. | |
| 2022/0192509 A1 | 6/2022 | Leabman | |

OTHER PUBLICATIONS

Domenico Zito et al., "Wearable System-on-a-Chip UWB Radar for Health Care and its Application to the Safety Improvement of Emergency Operators", ResearchGate, Annual International Conference of the IEEE Engineering in Medicine and Biology Society, IEEE Engineering in Medicine and. Biology Society Conference, Feb. 2007, 5 pages.

First Chinese Office Action mailed on Aug. 1, 2025, issued in Chinese Application No. 202380075802.6; 12 pages.

* cited by examiner

HEMODYNAMIC MONITORING SYSTEM

CROSS-REFERENCE TO RELATED APPLICATION

This application claims the benefit of U.S. Provisional Application No. 63/409,586, filed Sep. 23, 2022; and U.S. Provisional Application No. 63/460,863, filed Apr. 20, 2023; the entire disclosure of which are hereby incorporated by reference.

BACKGROUND

The present disclosure relates generally to the field of radio frequency (RF) signal generation. More particularly, the present disclosure relates to systems and methods for detecting physiological information using RF signals.

RF systems can output signals that can be used to detect physiological information about various subjects, including human subjects. For example, RF systems can output signals that are reflected by the subject. The reflection may occur at the boundary between an organ and tissue. The reflected signals are acquired as return signals, which can be evaluated to determine physiological information about the subject. However, in many situations it is difficult to determine information about the subject based on the return signals, because of, for example, insufficient amount or insufficient clarity of the return signals.

Accordingly, improved systems and methods are needed for determining physiological information about the subject based on RF signals.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Different embodiments of the inventive technology use a pulsed radio technology in the ultra-wide band (UWB) RF spectrum. Unlike other RF technologies, UWB is attractive because its implementation often does not require expensive and/or complicated components such as mixers, filters, RF/IF converters, and local oscillators. The systems of the inventive technology are focused on achieving frequency and aspect diversity that enhances its phenomenological detection capabilities.

The system in accordance with the inventive technology may be understood as a Non-Invasive Hemodynamic Monitoring System (NIHMS) that exploits specific radio frequency (RF) electromagnetic (EM) waveforms to enable continuous data collection. In some embodiments, the inventive NIHMS systems and methods provide yield estimates of quantities such as cardiac volumetric flow output rate, volume difference and/or ejection fraction (collectively, physiological parameters), some of which can also be measured traditionally using invasive measures, e.g., Swan-Ganz catheterization. In some embodiments, the system uses a waveform generator connected to a transmitter along with one or more receivers that are positioned on the torso. Both transmitter and receiver(s) can be based on antennas having the following characteristics:

Transmitters/receivers are optimized for operation in a specific range of frequencies;

Transmitters/receivers are mounted on a substrate that is impedance-matched to the epidermis, resulting in low transmission loss; and Form-factor (cross-sectional area, thickness and material properties) of the transmitters/receivers enables a consistent contact with the patient during NIHMS operation.

In some embodiments, the received waveform has been modulated by its interaction with internal structures, for example, the blood volume in the heart and surrounding vasculature. Such interactions between the RF waveforms and the internal structures of the subject may include reflection, refraction, scattering, or otherwise changing or attenuating the RF waveforms. The received signal may be captured, recorded and subjected to data processing in order to produce informative output.

The inventive NIHMS is capable of providing diagnosticians with real-time estimates of hemodynamic quantities. Specifically, above-described signal modulation is affected not only through reflection (which is a dominant consideration in a conventional radar systems), but also through the nature of signal attenuation of the transmitted signal. For example, with the inventive technology, a portion of the transmitted energy reacts in response to the heart's blood content, blood content in the vasculature, tissue thickness and composition, etc. (i.e., body composition); this is due to the specific dielectric properties of blood when contained in a region of heart. In some embodiments, the heart's blood volume can be understood as acting as a transfer function that refracts the transmitted wave. The nature of this refraction varies in proportion to the amount of blood. Such "refraction" is not simply caused by the change in dielectric properties of the boundaries of heart but is also caused by varying dielectric losses along the signal path. Monitoring the change in the received signal enables tracking both short-term (quasi-instantaneous) and long-term variations, both of which may be diagnostic indicators of the physiological parameters.

In some embodiments, signal modulation is at least in part based on positioning of the receive antennas, both absolutely and relatively with respect to the transmitter. The positioning of the transmit/receive antennas may promote the underlying signal interaction phenomenology described above.

Due to the nature of the RF signal transmission and heart/blood volume interaction, processing of the received waveform focuses on extracting signal properties that have encoded both extensive and temporal quantities during their transmission through the subject.

In order to isolate these signals of interest corresponding to instantaneous values of measurements of diagnostic relevance (such as stroke volume, volumetric flow output rate and/or ejection fraction), as well as to mitigate the effects of confounding and/or spurious data, the signal processing may take place in the frequency/Fourier domain. By tracking the variation of the amplitude of frequency components that correspond to those at which normal bodily functions typically occur, NIHMS may correlate received signals to hemodynamic properties of interest. Furthermore, with suitable calibration procedure, NIHMS may also infer characteristics of the absolute (e.g., non-relative) values of the hemodynamic properties of interest (e.g., volumetric flow output rate, volume difference, ejection fraction). These amplitude variations may be referred to as the whole volume signal or V.

Finally, we note that the proposed methodology is also particularly well suited for providing real-time continuous tracking, which enables monitoring of hemodynamic variation over timescales that are commensurate with patient hospital stays or in-home stays while being monitored.

In one embodiment, a system for non-invasive monitoring of a subject's heart includes: an RF transmitting antenna configured for transmitting at least one transmitted RF signal toward the subject and an RF receiving antenna configured for receiving at least one received RF signal transmitted by the RF transmitting antenna and modified by a subject's body. The RF transmitting antenna and the RF receiving antenna are located on opposing sides of a planar projection of the subject's heart. The system also includes a processing circuit configured for: controlling the transmitting of the at least one transmitted RF signal, controlling the receiving of the at least one received RF signal, and determining, based on the at least one received RF signal, at least one physiological parameter of the subject.

In one aspect, the physiological parameter is a volumetric flow output rate that is determined as (Vmax−Vmin)/Δt, where:
Vmax represents a maximum volume of the subject's heart during at least one cycle of heartbeat,
Vmin represents a minimum volume of the subject's heart during at least one cycle of heartbeat, and
Δt represents a time difference between measurements of Vmax and Vmin.

In another aspect, the physiological parameter is a volume difference that is determined as Vmax−Vmin, where:
Vmax represents a maximum volume of the subject's heart during at least one cycle of heartbeat, and
Vmin represents a minimum volume of the subject's heart during at least one cycle of heartbeat.

In one aspect, the at least one transmitted RF signal is modified by the subject's body through attenuation with the heart of the subject in proportion to an amount of blood in the subject's heart.

In another aspect, the at least one transmitted RF signal is modified by the subject's body through reflection, scattering, or refraction with the heart of the subject in proportion to the amount of blood in the subject's heart.

In one aspect, the at least one transmitted RF signal is transmitted as an RF chirp within a range of frequencies extending from a first RF chirp frequency to a second RF chirp frequency, wherein the second RF chirp frequency is greater than the first RF chirp frequency.

In one aspect, the RF chirp is centered at about 1 GHz, the first RF chirp frequency is about 500 MHz, and the second RF chirp frequency is about RF chirp frequency is about 1.5 GHz.

In another aspect, the RF chirp is centered at about 1 GHz, the first RF chirp frequency is about 750 MHz, and the second RF chirp frequency is about 1.25 GHz.

In another aspect, the RF chirp is a first RF chirp, wherein the at least one transmitted RF signal further comprises a second RF chirp within a range of frequencies extending from a third RF chirp frequency to a fourth RF chirp frequency, where the third and fourth RF chirp frequencies are greater than the second RF chirp frequency.

In one aspect, the RF chirp is transmitted at a chirp rate α that is determined as: (the second RF chirp frequency−the first RF chirp frequency)/T, where T is a time required for transmitting the RF chirp.

In one aspect, the chirp rate α is in a range from 10 MHz/μsec to 25 MHz/μsec.

In one aspect, RF chirps are transmitted with a duty factor τ that is given by $$\frac{T}{T+t},$$

wherein t signifies a time during which the RF chirps are not transmitted, and wherein the RF chirps are repeated in a range from 200 Hz to 1 MHz.

In one aspect, the system also includes:
a digital to analog converter (DAC) coupled to the RF transmitting antenna;
an analog to digital converter (ADC) coupled to the RF receiving antenna; and
a mixer configured to combine the at least one transmitted RF signal and the at least one received RF signal.

In one aspect, the RF transmitting antenna is attached to the subject at an apex of the heart of that is located at about sixth or seventh rib of the subject; and the RF receiving antenna is attached to the subject over a top of the heart of that is located proximate to subject's clavicle.

In another aspect, the RF receiving antenna is a first RF receiving antenna, the system further comprising a second RF receiving antenna that is attached opposite the first RF receiving antenna with respect to the planar projection of the subject's heart.

In one embodiment, a method for non-invasive monitoring of a subject's heart includes: transmitting at least one transmitted RF signal toward a subject by an RF transmitting antenna; and receiving, by an RF receiving antenna, at least one received RF signal transmitted by the RF transmitting antenna and modified by the subject. The RF transmitting antenna and the RF receiving antenna are located on opposing sides of a planar projection of the subject's heart. The method also includes controlling the transmitting of the at least one transmitted RF signal and receiving of the at least one received RF signal by a processing circuit; and determining, based on the at least one received RF signal, at least one physiological parameter of the subject.

In one aspect, the physiological parameter is a volumetric flow output rate that is determined as (Vmax−Vmin)/Δt or a heart stroke volume that is determined as Vmax−Vmin, where:
Vmax represents a maximum volume of the subject's heart during at least one cycle of heartbeat,
Vmin represents a minimum volume of the subject's heart during at least one cycle of heartbeat, and
Δt represents a time difference between measurements of Vmax and Vmin.

In one aspect, the at least one transmitted RF signal is modified by the subject's body through refraction, reflection, scattering, or attenuation with the heart of the subject in proportion to an amount of blood in the subject's heart.

In one aspect, the at least one transmitted RF signal is transmitted as an RF chirp within a range of frequencies extending from a first RF chirp frequency to a second RF chirp frequency, wherein the second RF chirp frequency is greater than the first RF chirp frequency.

In one aspect, the RF chirp is centered at about 1 GHz, and the first RF chirp frequency is about 500 MHz and the second RF chirp frequency is about 1.5 GHz.

In another aspect, the RF chirp is centered at about 1 GHz, the first RF chirp frequency is about 750 MHz, and the second RF chirp frequency is about 1.25 GHz.

In another aspect, the RF chirp is transmitted at a chirp rate α that is determined as: (the second RF chirp frequency−the first RF chirp frequency)/T, where T is a time required for transmitting the RF chirp, wherein the chirp rate α is in a range from 10 MHz/μsec to 25 MHz/μsec.

In one aspect, RF chirps are transmitted with a duty factor τ that is given by $$\frac{T}{T+t},$$

wherein t signifies a time during which the RF chirps are not transmitted, and wherein the RF chirps are repeated in a range from 200 kHz to 1 MHz.

In one aspect, the method includes combining the at least one transmitted RF signal and the at least one received RF signal by a mixer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of preferred embodiments, it will be apparent to those skilled in the art that variations may be applied to the articles and/or methods and in the steps or in the sequence of steps of the method described herein without departing from the concept, spirit, and scope of the presently disclosed and/or claimed inventive concept(s).

As utilized in accordance with the present disclosure, the following terms, unless otherwise indicated, shall be understood to have the following meanings.

The use of the word "a" or "an" when used in conjunction with the term "comprising" may mean "one", but it is also consistent with the meaning of "one or more", "at least one", and "one or more than one". The use of the term "or" is used to mean "and/or" unless explicitly indicated to refer to alternatives only if the alternatives are mutually exclusive, although the disclosure supports a definition that refers to only alternatives "and/or". Throughout this application, the term "about" is used to indicate that a value includes the inherent variation of error for the quantifying device, the method being employed to determine the value, or the variation that exists among the study subjects. For example, but not by way of limitation, when the term "about" is utilized, the designation value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

In the context of this disclosure, the terms "about," "approximately," "generally" and similar mean +/−5% of the stated value.

Figure 1:
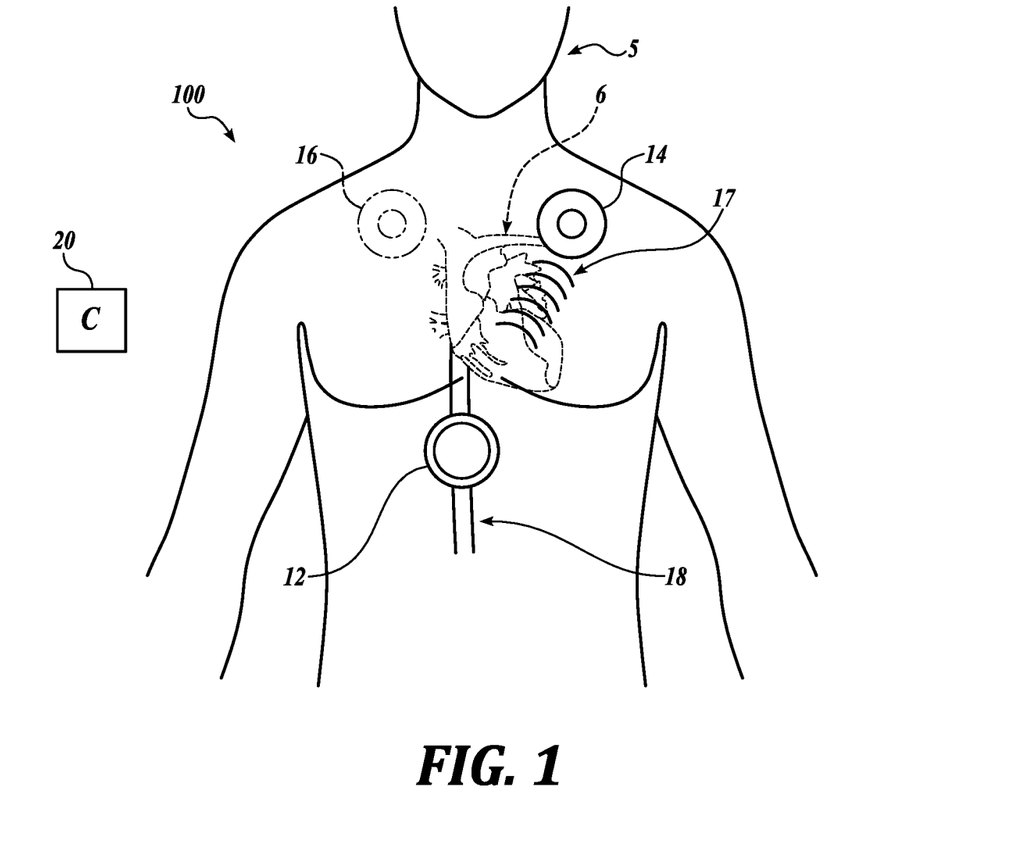
FIG. 1 illustrates a radio frequency (RF) system in accordance with the present disclosure.

FIG. 1 illustrates a radio frequency (RF) system 100 in accordance with the present disclosure. Illustrated system 100 may operate in the ultra-wide band (UWB) RF spectrum. System 100 may be a Non-Invasive Hemodynamic Monitoring System (NIHMS) that is based on specific radio frequency (RF) electromagnetic (EM) waveforms capable of continuous data collection.

The system 100 includes at least one transmitter (TX) 12 and one or more receivers (RX) 14, 16. The illustrated embodiment includes two RX-es 14, 16, however, the systems with one RX or more than two RX-es are also possible. In the context of the present disclosure, the terms antenna and receiver (RX), or antenna and transmitter (TX) are used interchangeably. However, a person of ordinary skill would know that the terms receiver and transmitter may also encompass electronics that support the antennas.

The transmitter 12 and one or more receivers 14, 16 may be attached to the body of a subject (patient) 5 by straps (harness) 18. In operation, transmitter 12 emits RF waveforms 17 toward a heart 6 of the subject. After interacting with the tissue on the patient, including the interfaces between the heart and other tissue, volume of the blood in the heart and surrounding vasculature, shape of the heart in a given moment, etc., a modified waveform 17 is received by one or more receivers 14, 16. The received signal may be captured, recorded and subjected to data processing in order to produce informative output corresponding to one or more physiological parameters. Controller 20 may control and synchronize the operation of system 100.

In some embodiments, the TX 12 may be placed notionally over the apex of the heart (e.g., just under the heart, at about sixth or seventh rib). The TX 12 creates a propagating RF field 17, which may spread in different directions, while interacting with the medium (tissue, heart, blood, etc.) on its way to the RX 14. Examples of such interactions are RF signal reflection, refraction, scattering, or attenuation of the RF waveforms. At least some of these interactions will take place with the heart 6 of the patient.

The TX antenna and RX antenna may be placed on different sides of the subject, for example, the TX antenna being placed on the chest of the subject, while the RX antenna is placed on the back of the subject, or the other way round, i.e., the TX antenna being placed on the back of the subject, while the RX antenna is placed on the front (chest) of the subject. Such placement of the TX/RX antennas may promote passage of the RF forms through the heart and associated and surrounding vasculature. In some other situations, it may be beneficial to place both the TX and RX antennas on the same side of the subject, for example, placing both the TX and RX antennas if the subject (patient) needs to lay on the back in a hospital environment.

In some embodiments, the RX 14 is placed notionally over the top of the heart (e.g., approximately 1-2 inches under left clavicle location, that is, proximate to subject's clavicle), and the TX is placed notionally near the apex of the heart (e.g., approximately between the sixth and seventh right rib). Therefore, in some embodiments, the TX antenna and the RX antenna are located on the opposing sides of a planar projection of the patient's heart (e.g., one antenna on the chest of the patient, the other antenna on the back of the patient). In some embodiments, system 100 may include one or more additional RX-es 16 (shown in phantom line as an optional component). For example, a second RX antenna may be attached generally opposite from the first RX antenna with respect to the planar projection (i.e., projection into the plane of paper with respect to FIG. 1) of patient's heart. In general, multiple RX-es (antennas) result in a better coherence of the received signal, typically providing a sqrt(2) signal coherence benefit based on the second RX. However, each antenna may generate a separate, i.e., independent noise that may be coherent or non-coherent noise. Such separate noise has to be addressed before or during the data processing. A person of ordinary skill would understand that even though some noise may be coherent, it is the non-coherent noise that is more challenging to filter out.

Generally, the RX antenna will be an entity that is spatially separated from the TX antenna, thus making the NHIMS, by design, a multistatic system. However, in other embodiments, the TX and RX antenna may be the same physical part, thus the system being based on a common transceiver (TRX).

In operation, energy of the returning (received) RF waveforms 17 is picked up by the RX antenna(s) from the entire field. In some embodiments, the received waveforms have been modulated by their interactions with internal structures, for example, the blood volume in the heart and/or the volume of the heart at the time of data acquisition. Typically, as the heart fills with blood, the received signal captured by the RX(es) is attenuated more, therefore enabling an estimate of the amount of blood in the heart or a volume of the heart for a given RF signal The received signal may be captured, recorded, and subjected to data processing in order to produce informative output.

Any of the RF signals that propagate through a body of the subject will have amplitude or time of flight changed. Therefore, the received signal will be modified by the properties of the subject's body in comparison to the signal originally transmitted as well as to the previously received signals.

By performing multiple data acquisitions by the RX(s), a first-order model of the blood circulation system may be constructed based on the interaction of the blood volume, volume of the blood in the vasculature, thickness and temporaneous shape of the heart, etc., with the pumping mechanisms of the heart. Stated differently, the rate at which the blood flows can be related to the difference in maximum and minimum blood volume estimates, $V_{max}-V_{min}$, over the period of a single heartbeat is proportional to the rate at which the volume is changing, therefore producing an estimate of the volumetric flow output rate. For example, the cardiac performance may be at least partially represented as a flow rate corresponding to $(V_{max}-V_{min})/\Delta t$, where $V_{max}$ represents a maximum volume of the subject's heart during heartbeat, $V_{min}$ represents a minimum volume of the subject's heart during heartbeat, and $\Delta t$ represents a time difference between the measurements of $V_{max}$ and $V_{min}$. These signals may also produce estimates of other physiological parameters, for example, blood pressure and vascular resistance.

Therefore, in at least some embodiments, it is not necessary to know the exact values of $V_{max}$ and $V_{min}$ to determine the volume difference, as the relative difference between the $V_{max}$ and $V_{min}$ may suffice for determining the volumetric flow output rate. In many situations, system calibration may be simplified and shortened based on not having to estimate the exact values of $V_{max}$ and $V_{min}$. In different embodiments, other physiological properties of the heart or other patient's organ may be obtained. For example, a volume difference may be determined as $V_{max}-V_{min}$.

As explained above, signal modulation of the waveforms 17 is affected not only through the signal reflection, but also by the transmitted energy responding to the heart's blood content due to the specific dielectric properties of blood when contained in a region of heart. In some embodiments, the heart's blood volume in the heart and vasculature, shape of the heart at different points of the cycle, etc., may be understood as acting as a transfer function that captures refraction of the transmitted wave on its way to the RX(es). Such "refraction" is caused by varying dielectric losses along the signal path, dielectric properties of the boundaries of heart, and volume of the blood at a given instant of time. In different embodiments, monitoring the change in the received signal enables tracking both short-term (quasi-instantaneous) and long-term variations, both of which may be diagnostic indicators of the physiological parameters.

Figure 2:
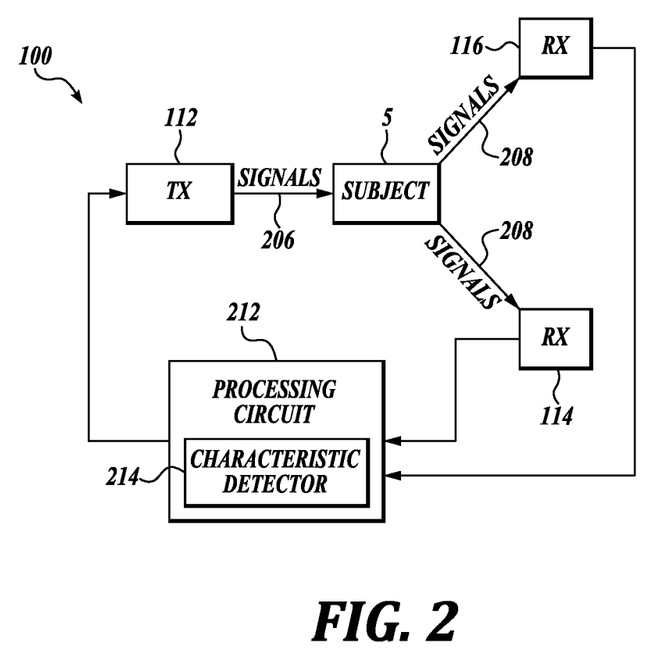
FIG. 2 is a schematic of a radio frequency (RF) system in accordance with the present disclosure.

FIG. 2 is a schematic of a radio frequency (RF) system 100 in accordance with the present disclosure. The system 100 can be used to control signal characteristics (or parameters) of transmitted signals in order to receive signals that effectively provide useful representing physiological information of interest, including, but not limited to, cardiac characteristics such as volume difference or volumetric flow output rate (also referred to as physiological parameters).

The system 100 can include transmitter (TX) 112 and receivers (RX-es) 114, 116 that are made from materials and components that facilitate receiving signals that effectively provide this information, such as to maximize efficiency of the received signal. Efficiency may be understood as efficiency of converting RF signals to voltage at the analog-to-digital converter (ADC). Additionally, efficiency may be improved by increasing an area of interest for the RF interrogation, which may be achieved by augmenting beam pattern and a pattern of antenna placement. The transmitter 112 and receivers 114, 116 include antennas for transmitting/receiving RF signals. However, for convenience and brevity, the transmitter 112 may be referred to as the transmitter antenna, and the receivers 114, 116 may be referred to as the receiver antennas. In some embodiments, such as depicted in FIG. 2, the system 100 can include a single transmitter 112 to output signals 206 (e.g., transmitted signals) towards the subject 5, and a plurality of receivers 114, 116 to receive signals 208 (e.g., return signals affected by transmission, reflection, refraction, or otherwise scattering of the signals that were initially transmitted by the TX 112. As described herein, the transmitting/receiving antennas can be impedance matched to the subject and can include or be coupled with various components, such as reflectors and backings, to improve the signal transmitting and receiving in the frequency ranges useful for determining physiological characteristics (also referred to as physiological parameters) of interest.

The system 100 can include a processing circuit 212 (e.g., a controller, a control circuit), which can be used to control operation of the TX and RX. The processing circuit 212 can control operation of the TX 112 to control one or more characteristics (e.g., variables, parameters) of the first signals 206 to be transmitted toward the subject. For example, the processing circuit 212 can control at least one of a frequency, phase, amplitude, duration, intermittency, or other characteristics of the first signals 206. The processing circuit 212 can also process received signals 208 that are acquired by one or more RX 114, 116 to determine the target characteristics of the subject (e.g., a volume difference). In some embodiments, the processing circuit 212 can include or be coupled with a vector network analyzer (VNA). The processing circuit 212 may be a digital processor, an analog processor, a controller, or similar, and may also include nonvolatile memory and software. In different embodiments the processing circuit may be a computer or a smart device that includes suitable software for controlling the signal transmitting and receiving, and for processing the acquired data.

The processing circuit 212 can process the received second signals 208 to determine physiological characteristics (or variables associated with physiological characteristics) of the subject 100, including volume difference. For example, the processing circuit 212 can apply the signal data as an input to a characteristic detector 214 that includes one or more filters, functions, calibrations, regressions, models, or other relations to determine the physiological characteristics (parameters). For example, the characteristic detector 214 can apply the signal data as input to a regression function determined from at least one of experimental data or simulation data (e.g., in which values of volume difference are predetermined by controlling the volume difference, and the signal data is measured while the volume difference is controlled) to generate the volume difference (or other physiological characteristics or parameters or values thereof) as output.

Figure 3A:
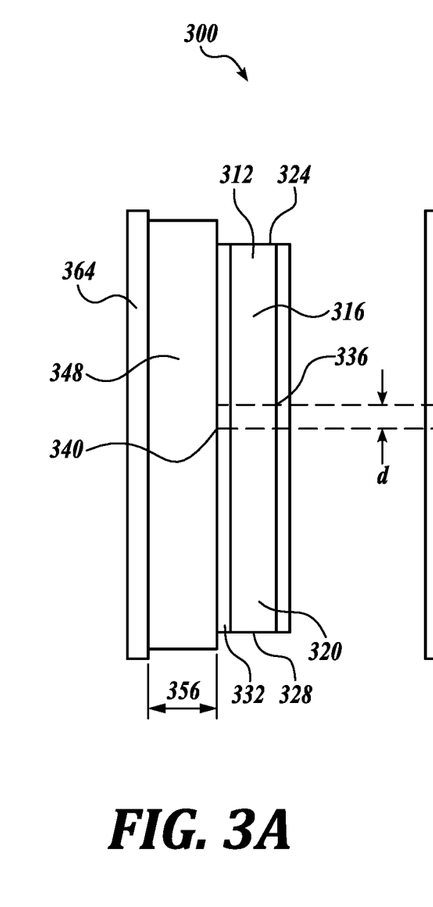
FIGS. 3A and 3B illustrate different views of an antenna of the RF system in accordance with the present disclosure.
Figure 3B:
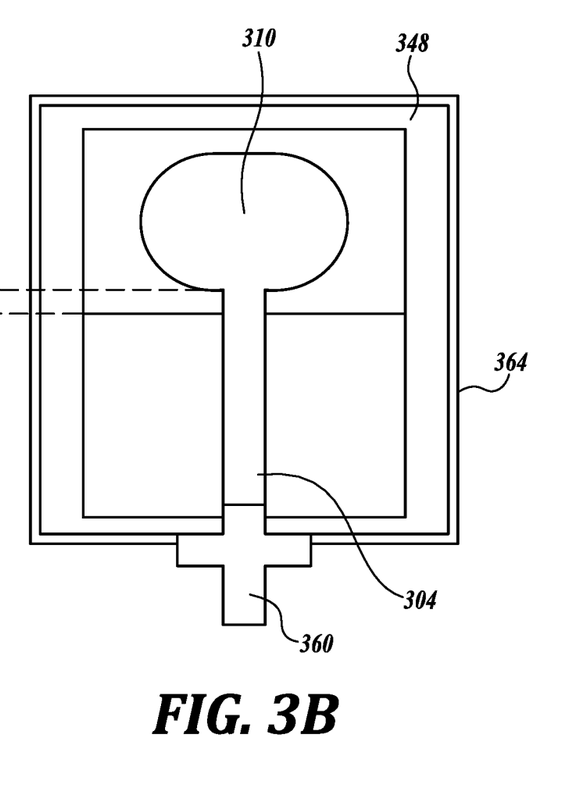

FIGS. 3A and 3B illustrate an antenna 300 of the RF system in accordance with the present disclosure. The antenna 300 may be part of the TX 112 or RX-es 114, 116. In some embodiments, the antenna 300 can be a dual layer microstrip elliptical antenna that is configured to match a dielectric constant of a subject, such as a dielectric constant of fatty tissue, to avoid the need for a matching layer. For example, the antenna 300 can have a dielectric constant greater than or equal to 6 and less than or equal to 13, or a dielectric constant greater than or equal to 9 and less than or equal to 10. In some embodiments, the antenna 300 may be flexible for improved adhesion to the body of the patient.

The antenna 300 can include a monopole 310, such as a printed elliptical monopole, extending from a feed line 304. The monopole 310 and feed line 304 can be implemented on a substrate 312, such as a planar substrate that can have the dielectric constant to match that of the subject. The monopole 310 can be provided on a first portion 316 of the substrate 312, and the feed line 304 can be provided on a second portion 320 of the substrate. The substrate 312 can extend from a first end 324 (at an edge of the first portion 316) to a second end 328 (at an edge of the second portion 320).

The substrate 312 can include or be coupled with a ground plane 332. The ground plane 332 can be on the second portion 820 of the substrate 812 on an opposite side of the second portion 320 from the feed line 304. As depicted in FIG. 3, a distance d can be defined between a point 336 corresponding to a boundary or transition between the monopole 310 and the feed line 304 and a point 340 corresponding to an edge of the ground plane 332 (e.g., a distance between a projection of the ground plane 332 onto a same plane as the monopole 310 and the monopole 310). The distance d can be made to adjust at least one of a bandwidth (e.g., frequency range) or resonance frequency of the antenna 300.

In some embodiments, the antenna 300 can include or be coupled with a reflector 348, which can cause an increase in the transmitted power. The reflector 348 can be made from a same material or substrate as the substrate 312. The reflector 348 can be made from a relatively high dielectric constant, such as alumina or mica. The reflector 348 can have a greater surface area than the substrate 312, as well as a thickness 356 that is greater than the thickness of the substrate 312. For example, the thickness 356 of the reflector 348 can be between two to ten times the thickness of the substrate 312.

The antenna 300 can include or be coupled with a connector 360 that is coupled with the feed line 304 to provide power to the antenna. The connector 360 can be made to be relatively thin to avoid or minimize an air gap between the antenna 300 and the subject 5 (e.g., the air gap can result in an impedance mismatch, which, as an example, can cause a decrease in transmitted power of 5 dB with an air gap of 2 mm). The connector 360 can be a coaxial connector. The connector 360 can have a thickness less than or equal to 3 mm. The connector 360 can have a thickness less than nor equal to 2 mm. The connector 360 can have a thickness less than or equal to 1 mm.

The antenna 300 can include or be coupled with a backing 364. The backing 364 can function as a cavity backing to help control the direction of RF signal transmission, particularly to ensure that the RF signals are injected (transmitted) into the body of the subject 5 with minimal coupling to the surrounding environment, such as where an air gap is formed (e.g., as noted above with respect to the connector 360). The backing 364 can be formed along at least one side of the reflector 348, including up to all four sides. The backing 364 can be made from a metallic material, such as copper tape. By implementing the backing 364 using a material such as copper tape, the backing 364 can be removably coupled with the reflector 348, allowing for selective use of the backing 364 depending on the effect of an air gap (if any is present) that may otherwise reduce the RF signal transmission/reception.

Figure 4:
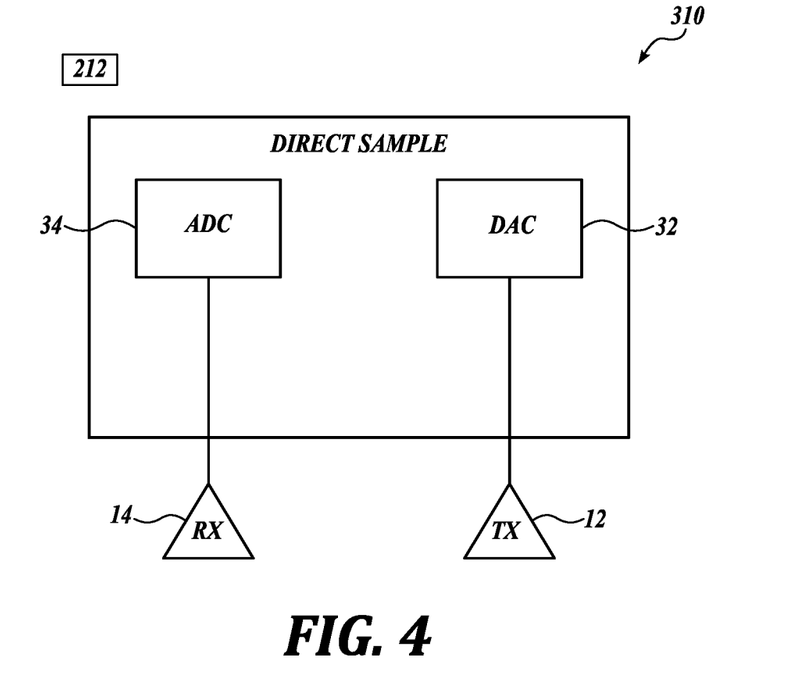
FIGS. 4-6 are RF systems in accordance with the present disclosure.
Figure 5:
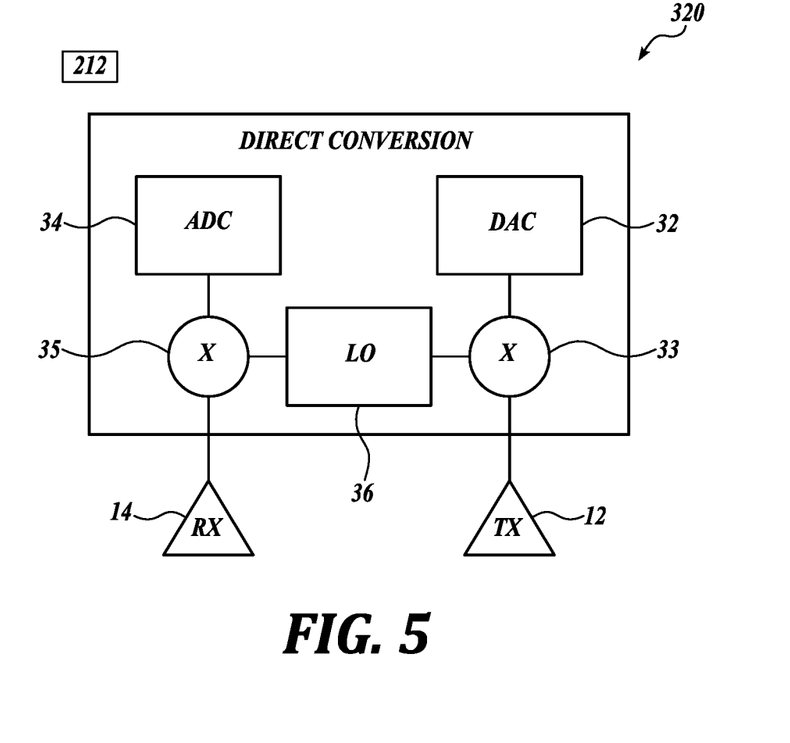
Figure 6:
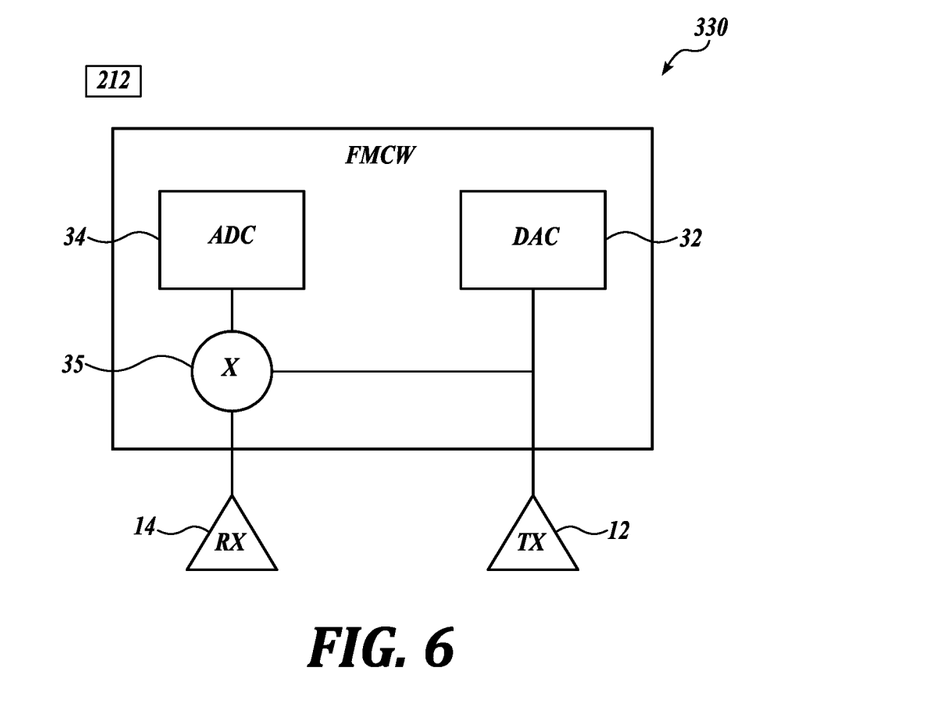

FIGS. 4-6 are RF systems in accordance with the present disclosure. In particular, FIG. 4 shows an RF system 310 that is based on direct sampling of the signal. In operation, the TX 12 sends signals to a digital to analog conversion (DAC) circuit 34, and further to the antenna. The RF signal travels toward the patient, and the return (received) signal is received by the analog to digital conversion (ADC) circuit 32 of the RX 12, the signal is acquired, and then further processed by, for example, processing circuit 212 shown in FIG. 2. However, such direct sampling suffers from certain shortcomings. For example, due to unsynchronized operation of the TX and RX, the system 310 requires a relatively high bandwidth to acquire the data by the RX in absence of some mechanism to synchronize operation of the TX and RX. Nevertheless, provided that components having sufficiently high ADC conversion rate and data storage rate are available, the illustrated system stores a wealth of data that can be subsequently processed to produce physiological parameters of interest.

FIG. 5 shows an RF system 320 that includes a local oscillator (LO) 36 and mixers 33, 35. In operation, operating frequency of the ADC 34 of the RX 14 may be linked with the operating frequency of the DAC 32 of the TX 12 by the operation of the local oscillator (LO) 36 and mixers 33, 35. The LO and the mixers of the system 320 operate to transfer the mean frequency of the data to be acquired toward lower frequencies, therefore reducing the required bandwidth of the data acquisition of the ADC 34 and the speed of storing the data on the memory media. However, the illustrated RF system is also relatively complex (i.e., includes a relatively high count of parts), and may be expensive and prone to failure.

FIG. 6 shows an RF system 330 that includes a mixer 35. The illustrated RF system is referred to as a frequency modulated continuous wave radar, or FMCW radar. In operation, the operating frequency of the ADC 34 of the RX 14 may be linked to the operating frequency of the DAC 32 of the TX 12 through the mixer 35. A person of ordinary skill would know that an RF mixer may be an active or passive device that converts a signal from one frequency to another frequency that is, for example, a sum or a difference between the two input frequencies. Such operation may result in certain advantages. For example, the required bandwidth of the data acquisition of the ADC 34 is reduced. Furthermore, the operation of the TX 12 and RX 14 (i.e., the operation of the DAC 32 and ADC 34) may be synchronized. Such synchronization may be important in view of the frequency chirp operation of the system 330 that is described with reference to FIG. 7 below. As shown in FIG. 6, the FMCW radar technology is attractive because its implementation does not require expensive and/or complicated components such as multiple mixers, filters, RF/IF converters, and local oscillators. Operation of the FMCW system is further explained below with respect with FIG. 7.

Figure 7:
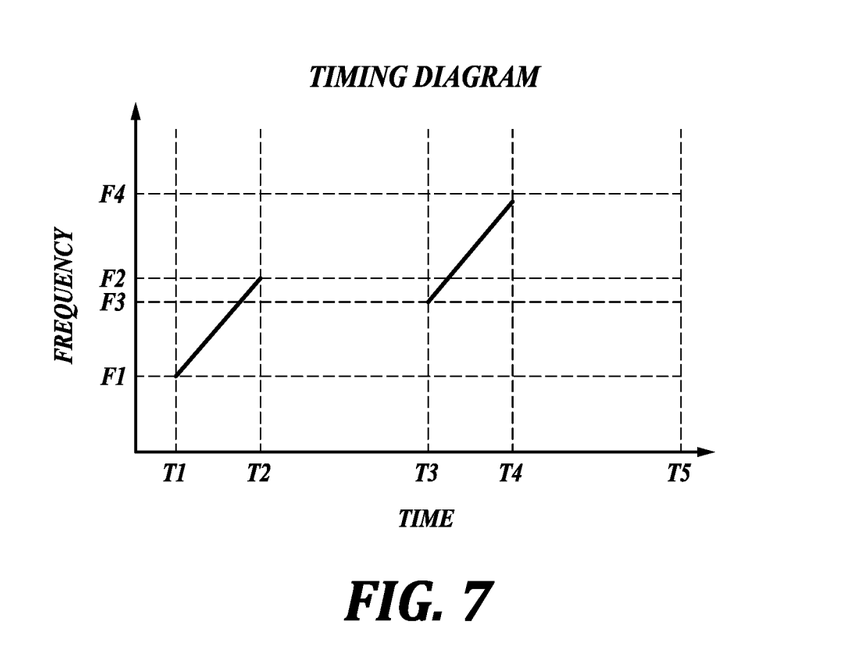
FIG. 7 is a signal timing diagram in accordance with the present disclosure.

FIG. 7 is a signal timing diagram in accordance with the present disclosure. The horizontal axis of the signal timing diagram is the time axis. The vertical axis shows the frequency of the RF signal. Two RF chirps are shown, one taking place between times T1 to T2 where the frequency changes from F1 to F2, the other taking place between times T3 to T4 where the frequency changes from F3 to F4. FIG. 7 illustrates an embodiment with overlapping ranges of chirp frequencies, that is, a high frequency F2 of one chirp being greater than a low frequency F3 of the other chirp. However, a person of ordinary skill would understand that the range frequencies of the illustrated chirps may be non-overlapping, that is, a high frequency F2 of one chirp being less than a low frequency F3 of the other chirp. In some embodiments, just one RF chirp may be present, and repetitively executed for determining physiological parameters. The frequency bands (F1 to F2 and/or F3 to F4) represent signals consisting of a linear frequency modulated (LFM), or chirped, transmission. In some embodiments, different chirps may be ascending or descending in terms of the starting and ending frequencies.

Transmitted Signal

The inventive NIHMS transmitted waveform is designed to interrogate a large swath of frequency space. For example, F1 and F2 may correspond to about 500 MHz and 1.5 GHz, respectively, resulting in a bandwidth of 1 GHz centered at 1 GHz center frequency. In other embodiments, F1 and F2 may correspond to 750 MHz and 1250 MHz, resulting in a bandwidth of 500 MHz centered at 1 GHz. Other values of F1 and F2 are also possible, as well as different combinations of the chirps (combinations of chirps are shown by F1, F2, F3 and F4 in FIG. 7). In other embodiments, the center frequency may correspond to different values (e.g., not necessarily at 1 GHz, but some value between 800 MHz and 1.5 GHz). As explained above, systems with just one chirp (e.g., from F1 to F2) is also possible.

In different embodiments, transmitted power can range from 1-1000 mW, or from 10-800 mW. Such operating regime furnishes sufficient power to produce detectable received signals of interest while remaining comfortably within limits to ensure patient safety.

Bandwidth

As explained above, the signal may be transmitted within the frequency sweeps that is characterized by 500 MHz bandwidth between 750 MHz (F1) and 1250 MHz (F2). A complete traversal of this band is referred to as a sweep that takes place within duration T (e.g., T=T2−T1). During normal operation (i.e., while collecting continuously), multiple sweeps are transmitted/acquired, each sweep being separated from the next one by time t.

In operation, bandwidth enables resolution between the time of flight for different signals. For example, increased bandwidth enables higher resolution between the received signals having different times of flight.

In some embodiments, the bandwidth may shrink to zero, that is, the transmitted signal is sent at a constant frequency. In this case, a tradeoff would be a loss of a higher resolution between different time of flights (as described above). However, the system that operates at a constant (single) frequency would be simpler and less expensive. Such system that operates at a constant (single) frequency would still undergo changes in signal amplitude and time of flight differences described above.

Assuming the 500 MHz bandwidth, the chirp rate $\alpha$ can therefore be calculated according to the formula $$\frac{500}{T}.$$

The duty factor $\tau$ is given by $$\frac{T}{T+t},$$

therefore indicating the ratio of time spent transmitting to the total time in operation. In some embodiments, the inventive NHIMS operates with a value of T varying between 20-50 µsecs, which results in an $\alpha$ in the range from 10-25 MHz/µsec. The value of t may be commensurate to that of T. For example, assuming exact equality (i.e., t=T), this yields a $\tau$ of 0.5.

These choices of T and t are related to achieving an effective pulse (chirp) repetition frequency (PRF) in the range of about 1-5 kHz or about 200 Hz-1 MHz, which works well in many practical measurements. In some embodiments, a PRF exceeding 1.0 kHz is required so as to be able to detect physiological changes that take place at millisecond time scales; whereas ensuring that sampling occurs at Nyquist frequency or above advises to allow for PRFs at up to five times this minimum. Using frequencies lower than 200 Hz has challenges related to changes taking place with the patient, e.g., blood flow and subject motion being too close to the frequency of 200 Hz. On the other hand, the PRF exceeding 1 MHz is possible, but offers limited utility and can require hardware that is more difficult and/or expensive to manufacture. In some embodiments, a PRF of 7 kHz with duty factors of 50% works well. Generally, a frequency domain processing necessitates a sampling rate high enough to ensure nuanced feature detection and discrimination. A person of ordinary skill would know that for proper sampling, the sampling frequency should be at least twice as high as the highest frequency of interest in the signal, and preferably higher than twice the highest frequency of interest in the signal. The Nyquist frequency signifies the highest signal frequency that can be reconstructed by the sampling frequency, corresponding to one half of such sampling frequency.

Role of Center Frequency and Bandwidth

In some embodiments, the above-described choice of a 500-1000 MHz band centered at 1 GHz allows NIMHS to exploit multiple phenomena:

Advantageous transmission and material interaction (center frequency);

Range discrimination (bandwidth) providing ability to differentiate between received signals of interest (e.g., changing blood volume) and those caused by interaction with other 'ignore' values that reflect from other organs; and/or Material determination (bandwidth) making it possible to distinguish between alternatives by keying on differences in material properties with known frequency dependence.

In other embodiments, different choice of frequencies that define a chirp may also be used, for example, a chirp within a range of 800 MHz to 1.5 GHz may be used. As a representative, but a non-limiting calculation, let us assume approximately 8 K samples are collected per sweep (resulting in a spacing of approximately 62.5 kHz per sample) and 4 bytes (16-bit binary IQ) per sample, this yields 32 Kbytes of data per sweep per receive (RX) channel. Using a notional value of 40 µsecs for T and t, yields a data rate of around 400 MB/sec per receive (RX) channel. In some embodiments, the above-described signal processing may take place in an application specific integrated circuit (ASIC) or a field programmable gate array (FPGA).

In some embodiments, in order to enable data storage and data collection at substantially the same time, the method may downsample by a factor of N, with the value of N selected to accommodate data transfer rate capabilities of a particular storage media. The value N=10, for example, would produce a data rate of around 40 MB/sec, which is realizable in practice.

In some embodiments, the method uses frequency-transformed (FT) data, i.e., data to which a Fourier transform (typically via a fast Fourier transform or FFT) has been applied. In some practical situations, the goal is to obtain FT data at a rate of about 1 kHz or greater than 200 Hz, as the inventors have determined at least this rate to be desirable for distinguishing between signals arising due to phenomenology associated with the right and left ventricles. Higher rates also work, but lower rates would result in a certain loss of information. By exploiting the linearity of the FFT, the returns from a sequence of sweeps may be integrated (e.g., averaged or weighted-averaged).

As a non-limiting example of the above method, we can denote the number of integrated sweeps by M. By again making use of the notional value of 80 µsec per sweep (i.e., a sweep time T of 40 µsecs with a $\tau$ of 0.5) to produce FT data at 1 kHz, the method would need to take M to be about 12. The resulting FT data rate would be approximately 80 MB/sec per receive channel, assuming 8 byte complex data (i.e., 2 32-bit floats), which again is achievable with available ADCs and storage media.

Figure 8:
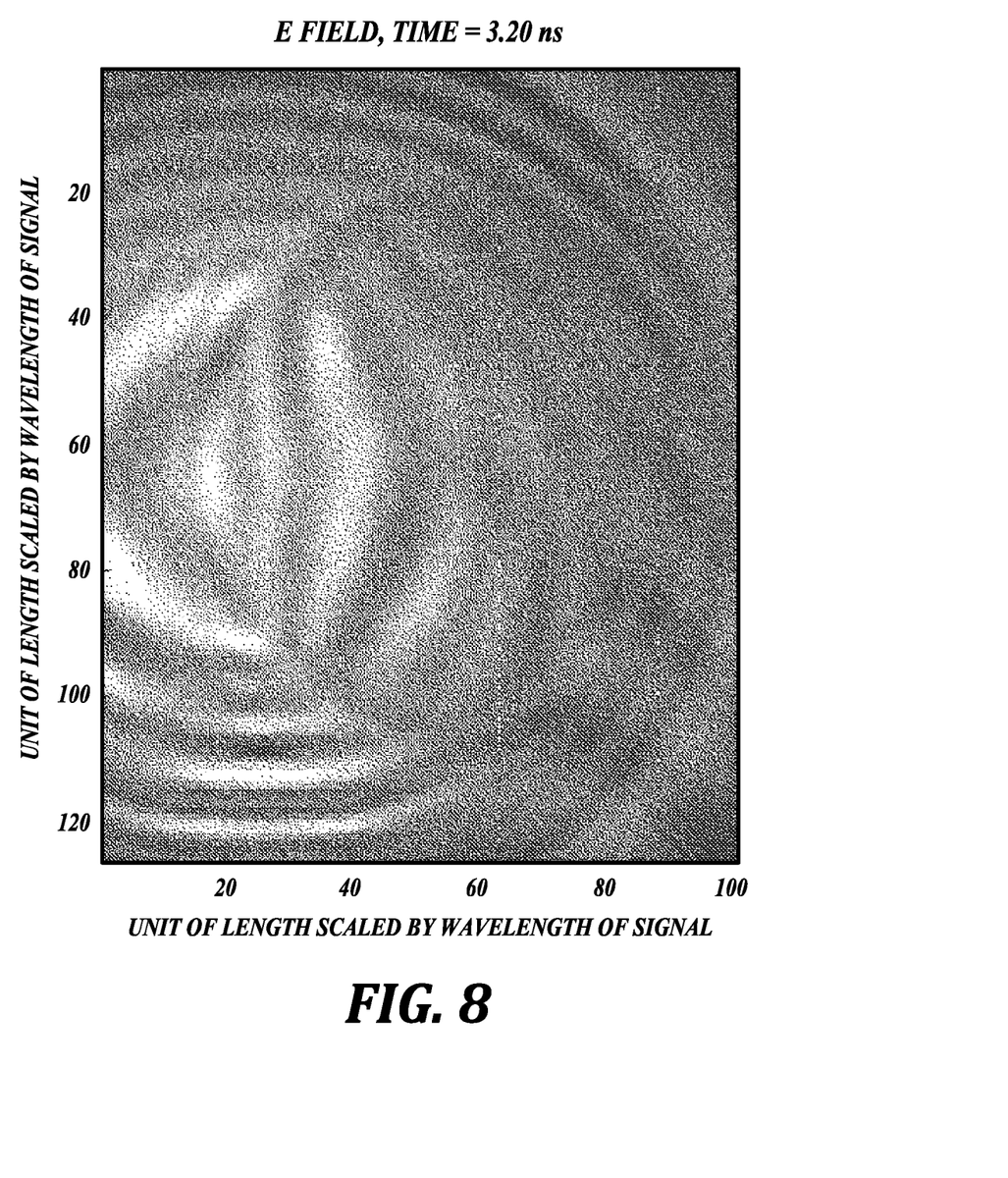
FIG. 8 is a graph of simulated interaction between RF waveform and subject's heart in accordance with the present disclosure.

FIG. 8 is a graph of simulated interaction between RF waveform and subject's heart in accordance with the present disclosure. The horizontal and vertical axes of the graph represent units of length that are scaled per the wavelength of the RF signal. Different shades represent different intensities (RF amplitudes of the E field) of the received RF signal after being refracted by the subject's heart at a particular instant of time (3.20 ns in the illustrated case). The choices of operational parameters outlined with respect to FIG. 7 above cause an interaction phenomenology in which the transmitted waveform couples electromagnetically to the blood in the heart, resulting in modulation that encodes hemodynamic variation.

Both analysis and simulations have demonstrated that a significant portion of transmitted energy reacts in response to the heart's blood content; this is due to the specific dielectric properties of blood when contained in an ellipsoidal region. As can be seen in FIG. 8, the heart's blood volume can be understood to act as a transfer function that describes refraction and attenuation of the transmitted wave. The nature of this refraction varies in proportion to the amount of blood in the heart. Generally, the modulation of the incoming (TX) signal occurs through a combination of multiple mechanisms. Therefore, the "refraction" that we refer to manifests not simply from the change in dielectric properties as the boundaries, but also from varying dielectric losses along the signal path (e.g., as the RF signal propagates through the heart). In many situations, a distance traveled by the RF signal is transferred into a time delay. Analogously, different type of dielectrics (corresponding to different types of tissue, presence of blood, etc.) that the RF signal encounters on its path from the TX to RX also result in different time delays of the RF signal. Conversely, different conductivities associated with different types of tissue, presence of blood, etc., cause different amount of signal attenuation. Many materials in the body can be described by such properties (e.g., thickness of the material, dielectric property, and/or conductivity). As the instantaneous geometry or properties of the tissue in the path of the RF signal change due to, for example, lung motion, material change (lungs, blood presence/absence) the amplitude and timing (e.g., trip delay) of the signal received by the RX also changes. As another example, more blood in the path of the RF signal leads to changes in the conductivity, in turn leading to higher attenuation of the signal. Therefore, monitoring the change in the received (RX) signal over time enables tracking both short-term (quasi-instantaneous) and long-term variations, both of which may be key diagnostic indicators.

Due to the nature of the above-described interaction between the transmitted signal and heart blood volume, processing of the received waveform includes extracting signal properties that have encoded both the extensive and the temporal quantities. In some embodiments, extensive properties of interest are those that correspond directly to instantaneous values of measurements of diagnostic relevance such as volume difference, volumetric flow output rate and ejection fraction. In order to help isolate these signals of interest, as well as mitigate the effects of confounding and/or spurious data, the signal processing may take place in the frequency/Fourier domain, as explained above with reference to FIG. 7.

By tracking the variation of (the amplitude of) frequency components that correspond to those at which normal bodily functions typically occur, the inventive NIHMS can correlate these to hemodynamic properties of interest and can also infer characteristics of their absolute (e.g., non-relative) values. These amplitude variations are referred to as the whole volume signal, V. Furthermore, volumetric flow output rate can be extracted from features of the whole volume signal. For example, a first-order model of the circulatory system, and specifically the interaction of the blood volume with the pumping mechanisms of the heart, exhibits behavior similar to current flowing through an electric circuit. Following this analogy, the rate at which current flows can be related to the instantaneous voltage, which is a potential difference. Therefore, in some embodiments, NIHMS relies on an analogue of this phenomenon, for example, a difference in maximum and minimum blood volume estimates, $V_{max}-V_{min}$ over the period of a single heartbeat is proportional to the rate at which the volume is changing, which is the volumetric flow output rate.

In some embodiments, the inventive NIHMS may be well suited for providing real-time continuous tracking, which enables monitoring of hemodynamic variation over time-scales that are commensurate with patient hospital stays or commensurate with at-home monitoring of the patient.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

What is claimed is:

1. A system for non-invasive monitoring of a subject's heart, the system comprising:
    an RF transmitting antenna configured for transmitting at least one transmitted RF signal toward a subject, wherein the at least one transmitted RF signal comprises:
        a first RF chirp within a range of frequencies extending from a first RF chirp frequency to a second RF chirp frequency, wherein the second RF chirp frequency is greater than the first RF chirp frequency, and
        a second RF chirp within a range of frequencies extending from a third RF chirp frequency to a fourth RF chirp frequency, wherein the fourth RF chirp frequency is greater than the second RF chirp frequency;
    an RF receiving antenna configured for receiving at least one received RF signal transmitted by the RF transmitting antenna and modified by a subject's body, wherein the RF transmitting antenna and the RF receiving antenna are located on opposing sides of a planar projection of the subject's heart; and
    a processing circuit configured for:
    controlling the transmitting of the at least one transmitted RF signal,
    controlling the receiving of the at least one received RF signal, and
    determining, based on the at least one received RF signal, at least one physiological parameter of the subject.

2. The system of claim 1, wherein the physiological parameter is a volumetric flow output rate that is determined as $(V_{max}-V_{min})/\Delta t$, where:
    $V_{max}$ represents a maximum volume of the subject's heart during at least one cycle of heartbeat, $V_{min}$ represents a minimum volume of the subject's heart during at least one cycle of heartbeat, and Δt represents a time difference between measurements of $V_{max}$ and $V_{min}$.

3. The system of claim 1, wherein the physiological parameter is a volume difference that is determined as Vmax−Vmin, where:

Vmax represents a maximum volume of the subject's heart during at least one cycle of heartbeat, and Vmin represents a minimum volume of the subject's heart during at least one cycle of heartbeat.

4. The system of claim 1, wherein the at least one transmitted RF signal is modified by the subject's body through attenuation in proportion to an amount of blood in the subject's heart.

5. The system of claim 4, wherein the at least one transmitted RF signal is modified by the subject's body through reflection, scattering, or refraction in proportion to the amount of blood in the subject's heart.

6. The system of claim 1, wherein the first RF chirp is centered at about 1 GHz, the first RF chirp frequency is about 500 MHz, and the second RF chirp frequency is about 1.5 GHz.

7. The system of claim 1, wherein the first RF chirp is centered at about 1 GHz, the first RF chirp frequency is about 750 MHz, and the second RF chirp frequency is about 1.25 GHz.

8. The system of claim 1, wherein the third RF chirp frequency is greater than the second RF chirp frequency.

9. The system of claim 1 wherein the first RF chirp is transmitted at a chirp rate α that is determined as: (the second RF chirp frequency−the first RF chirp frequency)/T, where T is a time required for transmitting the RF chirp.

10. The system of claim 9, wherein the chirp rate α is in a range from 10 sec to 25 MHz/μsec.

11. The system of claim 9, wherein first RF chirps are transmitted with a duty factor τ that is given by $$\frac{T}{T+t},$$

wherein t signifies a time during which the first RF chirps are not transmitted, and wherein the first RF chirps are repeated in a range from 200 Hz to 1 MHz.

12. The system of claim 1, further comprising:
a digital to analog converter (DAC) coupled to the RF transmitting antenna;
an analog to digital converter (ADC) coupled to the RF receiving antenna; and
a mixer configured to combine the at least one transmitted RF signal and the at least one received RF signal.

13. The system of claim 1, wherein:
the RF transmitting antenna is configured to be attached proximate to the sixth or seventh rib of the subject; and
the RF receiving antenna is configured to be attached proximate to the clavicle of the subject.

14. The system of claim 1, wherein the RF receiving antenna is a first RF receiving antenna, the system further comprising a second RF receiving antenna that is attached opposite the first RF receiving antenna with respect to the planar projection of the subject's heart.

15. The system of claim 1, wherein the third RF chirp frequency is less than the second RF chirp frequency.

16. A method for non-invasive monitoring of a subject's heart, the method comprising:

transmitting at least one transmitted RF signal toward a subject by an RF transmitting antenna, wherein the at least one transmitted RF signal comprises:
a first RF chirp within a range of frequencies extending from a first RF chirp frequency to a second RF chirp frequency, wherein the second RF chirp frequency is greater than the first RF chirp frequency, and
a second RF chirp within a range of frequencies extending from a third RF chirp frequency to a fourth RF chirp frequency, wherein the fourth RF chirp frequency is greater than the second RF chirp frequency;
receiving, by an RF receiving antenna, at least one received RF signal transmitted by the RF transmitting antenna and modified by the subject, wherein the RF transmitting antenna and the RF receiving antenna are located on opposing sides of a planar projection of the subject's heart;
controlling the transmitting of the at least one transmitted RF signal and receiving of the at least one received RF signal by a processing circuit; and
determining, based on the at least one received RF signal, at least one physiological parameter of the subject.

17. The method of claim 16, wherein the physiological parameter is a volumetric flow output rate that is determined as $(V_{max}-V_{min})/\Delta t$ or a heart stroke volume that is determined as Vmax−Vmin, where:

$V_{max}$ represents a maximum volume of the subject's heart during at least one cycle of heartbeat, $V_{min}$ represents a minimum volume of the subject's heart during at least one cycle of heartbeat, and Δt represents a time difference between measurements of $V_{max}$ and $V_{min}$.

18. The method of claim 16, wherein the at least one transmitted RF signal is modified by the subject's body through refraction, reflection, scattering, or attenuation in proportion to an amount of blood in the subject's heart.

19. The method of claim 16,
wherein the first RF chirp is centered at about 1 GHz, and wherein the first RF chirp frequency is about 500 MHz and the second RF chirp frequency is about 1.5 GHz, or
wherein the first RF chirp is centered at about 1 GHz, the first RF chirp frequency is about 750 MHz, and the second RF chirp frequency is about 1.25 GHz.

20. The method of claim 16, wherein the first RF chirp is transmitted at a chirp rate that is determined as: (the second RF chirp frequency−the first RF chirp frequency)/T, where T is a time required for transmitting the RF chirp, wherein the chirp rate α is in a range from 10 sec to 25 MHz/μsec.

21. The method of claim 20, wherein first RF chirps are transmitted with a duty factor τ that is given by $$\frac{T}{T+t},$$

wherein t signifies a time during which the first RF chirps are not transmitted, and wherein the first RF chirps are repeated in a range from 200 kHz to 1 MHz.

22. The method of claim 16, further comprising combining the at least one transmitted RF signal and the at least one received RF signal by a mixer.

23. The method of claim 16, wherein:
the RF transmitting antenna is attached proximate to the sixth or seventh rib of the subject; and the RF receiving antenna is attached proximate to the clavicle of the subject.

24. The method of claim 16, wherein the third RF chirp frequency is greater than the second RF chirp frequency.

25. The method of claim 16, wherein the third RF chirp frequency is less than the second RF chirp frequency.

* * * * *

UNITED STATES PATENT AND TRADEMARK OFFICE
CERTIFICATE OF CORRECTION

PATENT NO. : 12,465,231 B2  
APPLICATION NO. : 18/471954  
DATED : November 11, 2025  
INVENTOR(S) : David Nelson Coar et al.

Page 1 of 1

It is certified that error appears in the above-identified patent and that said Letters Patent is hereby corrected as shown below:

In the Claims

| Column | Line | |
|---|---|---|
| 17 | 7 | Claim 3, delete "Vmax-Vmin," and insert -- $V_{max}$-$V_{min}$, -- |
| 17 | 8 | Claim 3, delete "Vmax" and insert -- $V_{max}$ -- |
| 17 | 10 | Claim 3, delete "Vmin" and insert -- $V_{min}$ -- |
| 17 | 31 | Claim 9, delete "claim 1" and insert -- claim 1, -- |
| 18 | 28 | Claim 17, delete "Vmax-Vmin," and insert -- $V_{max}$-$V_{min}$, -- |

Signed and Sealed this  
Thirteenth Day of January, 2026

John A. Squires  
*Director of the United States Patent and Trademark Office*